Sept. 15, 1970

S. H. CHAPMAN 3,529,098

TWO RELAY LINE CIRCUIT

Filed May 19, 1967

INVENTOR
STEPHEN HAROLD CHAPMAN

BY

ATTORNEY 3,529,098

TWO RELAY LINE CIRCUIT

Stephen H. Chapman, Apolo, Guaynabo, Puerto Rico, assignor to International Telephone and Telegraph Corporation, New York, N.Y., a corporation of Maryland Filed May 19, 1967, Ser. No. 639,779
Int. Cl. H04q *1/30*
U.S. Cl. 179—19 6 Claims

ABSTRACT OF THE DISCLOSURE

A two-relay line circuit is positively driven to indicate each of the four possible logic conditions: line normal, line demanding service, service being given, and line in lockout. The line circuit does not include any slow release relays that are sensitive to marginal conditions which depend upon loop characteristics. The relays may be less expensive, and the lines may have wider parameters.

Figures 1, 2:
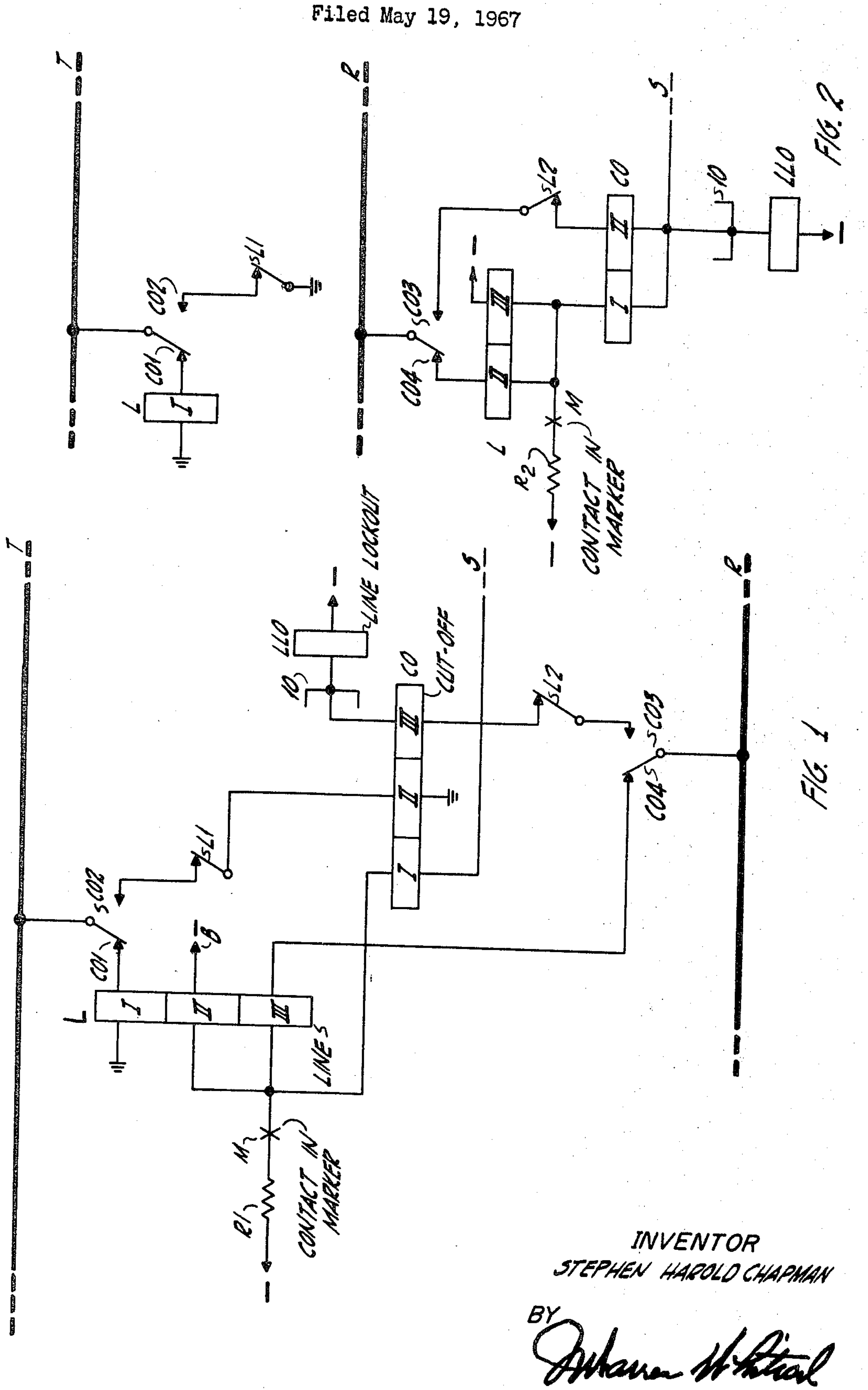

This invention relates to automatic telephone systems and most particularly to line circuits for use in such systems.

In a broad sense, automatic telephone systems are those systems which may complete a connection from a calling to a called line responsive to dial or other control signals sent from the calling line. Usually, the "other" signals are on-hook, off-hook signals; however, those skilled in the art know that pushbuttons, diode arrangements, oscillators, and the like, may also send "other" signals. Line circuits are the circuits which individually terminate every subscriber line and respond to the "other" control signals. For example, they may detect whether their individually associated subscriber station or stations are on or off-hook and whether a connection is or is not completed.

If a station goes off-hook, the associated line circuit extends a signal to the central office switching equipment to demand service. If the station goes on-hook, the line circuit returns to normal for indicating a released condition. If the line has a permanent loop (e.g. the station remains in an off-hook condition without being part of a connection), the line circuit times out, cancels the demand for service, and goes into a lockout condition. The lockout is canceled when the permanent loop is broken, as when the subscriber station is again placed in an on-hook condition.

The subscriber lines, and therefore line circuits, are the most numerous equipments in a telephone system. Hence, any added line circuit cost, however slight, is multiplied many times over. Because of this cost factor, a very great amount of work has already been done on line circuits, and very little room remains for improvement. Therefore, it is a great accomplishment when a new and improved line circuit accomplishes the old results in a more reliable manner and at a lower cost.

Moreover, subscriber lines, and therefore line circuits, are a limiting factor wihch tends to restrict the general improvement of telephone exchanges. More particularly, most of the exchange is indoors and well maintained by automatic monitoring equipment and trained personnel. Telephone lines are outdoors, and not easily maintained. Moreover, the construction costs are such that lines cannot easily be replaced or moved. Hence, new and old line equipment must work together. One result is an extremely wide variation in the electrical characteristics of individual lines. These line variations, in turn, impose severe parameter restrictions upon the line circuits and the components used therein. If there are improvements which increase the line circuit's capability for responding to wider parameters, that also represents a great step forward.

Accordingly, an object of this invention is to provide new and improved line circuits which operate more reliably over wider parameters and which are built at a lower cost. In this connection, an object is to provide line circuits which operate over line loops which are longer than those using comparable cost line circuits. A further object is to provide line circuits using relays which are simpler and less expensive than the relays which have been used heretofore. Here, an object is to provide relay line circuits which are not sensitive to certain marginal operating conditions that depend upon line characteristics. A further object is to provide line circuits made entirely from the relatively low cost relays where two windings are mounted on a single heel plate.

In keeping with one aspect of this invention, two relays (line and cutoff) are arranged to be positively driven responsive to each of the possible logic conditions which might occur on a telephone line. By driving the relays in such a positive manner, the circuit eliminates the effect of certain marginal operation conditions which depend upon line characteristics, as for example, the effect wherein one relay must operate or release during a timing cycle established by slow release characteristics of another relay. Removal of such line related marginal conditions enables the use of a simpler and less expensive relay construction and further enables the relays to operate reliably over longer lines with wider parameters.

The above mentioned and other features of this invention and the manner of obtaining them will become more apparent, and the invention itself will be best understood by reference to the following description of an embodiment of the invention taken in conjunction with the accompanying drawings, in which:

FIG. 1 is a schematic circuit diagram showing the invention incorporated in a balanced line circuit; and FIG. 2 is a schematic circuit diagram showing the invention as incorporated in an unbalanced line circuit.

The usual talking and control conductors T, R, and S appear in each of the figures. The subscriber station (not shown) is connected to the left-hand end of the heavily-inked conductors T and R. The central office switching equipment is connected to the right-hand end of the three conductors T, R, and S.

When the subscriber station goes off-hook (Fig. 1) the well known hook-switch contacts (not shown) close a loop across the heavily inked conductors. This completes a path traced from ground through winding I of relay L, contacts CO1, conductor T (to the left, as viewed in FIG. 1), the closed hook-switch contacts, and return on conductor R, contacts CO4, and windings III, II of relay L to battery B (shown by an arrowhead). Relay L operates to open contacts L1 and L2 for precluding any operation of relays CO (via windings II, III) and LLO at this time. Thus, operation of relay L by itself indicates a subscriber station which is off-hook and demanding service (i.e. no central office equipment has responded as yet), and any suitable contacts (not shown) on relay L may so indicate.

Depending upon the nature of the system, any suitable equipment may respond to the closed loop condition or the operation of relay L and seize the right-hand end of the conductors T and R. After the line has been connected through to the central office equipment, that equipment returns ground on the sleeve conductor S to operate the cutoff relay CO (via its winding I) in series with the line relay (L) winding II and the battery connected thereto. The line relay L is held operated via this circuit through its center winding II. Thereafter, relay CO opens its contacts CO1 and CO4 to break the original operating circuit for relay L, and to disconnect it from the talking conductors T, R. Contacts CO2 and CO3 close without effect because contacts L1, L2 are now open. Thus, relays L and CO are both operated while a connection is completed, and any suitable contacts (not shown) may be associated with these relays to logically interpret the line condition.

When the call is completed, the central office releases by removing ground from the sleeve conductor S. Relays L and CO restore. The line circuit has returned to normal, as indicated by the released condition of these two relays. Again, any contacts (not shown) required to interpret this line condition may be provided on relays L, CO.

If the associated subscriber line is permanently off-hook, as when a hand set is not properly replaced on a hook-switch, the initial response is the same as it would be for any off-hook condition. The line is seized and a timer begins to measure a time period during which the connection must be completed. However, it is assumed that this is not a true call, but is a permanent loop condition. Hence, dial pulses do not come in and the connection is not processed in a normal manner within the allotted time period.

After time-out, the marker closes the contacts M associated with the line circuit which appears to be placing the call that has timed out. This contact M applies a battery potential through resistance R1 to the junction between windings II and III on the line relay L. This winding II is shunted, and current drops in winding III owing to the resistance R1. Line relay L releases.

Responsive to the release of the relay L, contacts L1 and L2 close. Relay CO is held over a loop which is now completed from ground through winding II of relay CO, contacts L1, CO2, conductor T, the permanent loop across the line conductors T and R, contacts CO3, L2, winding III of relay CO, and the winding of the lockout relay LLO to battery. The fact that relay L is released and relay CO is operated indicates that the line is in lockout condition, and any suitable contacts (not shown) on these relays may be used to indicate such a lockout condition to associated equipment. Responsive thereto, ground is removed from sleeve S, and contacts M open to remove the connection through the resistance R1 to battery. The lockout relay LLO is common to many line circuits, as is indicated by the symbol 10. Any suitable contacts on relay LLO gives a suitable alarm signal to any associated equipment, with any desired results.

When the permanent loop is broken (as when a hand set is properly returned to its hook-switch), relay CO releases. The circuit has now returned to normal and is ready for the next call.

FIG. 2 shows an unbalanced line circuit which enables the system to operate on line loops which are longer than the loops for the balanced line circuit. When the subscriber station goes off-hook, line relay L operates over the path traced from ground through its winding I, contacts CO1, leftward on conductor T, and return through closed hook-switch contacts to conductor R, contacts CO4, L relay windings II and III to battery. The line relay L opens contacts L1, L2 and gives any suitable demand for service indication.

Any suitable equipment responds by seizing the right-hand end of conductors T, R, and S. Then the equipment returns ground over sleeve conductor S, winding I of relay CO, and winding III of relay L to battery. Both of the relays L and CO are held over this circuit; then, contacts CO1 and CO4 open to disconnect relay L from the line. A connection is in progress, as indicated by the operation of both of the relays L and CO.

When the station on the left-hand end of conductors T and R goes on-hook, the central office equipment releases and removes ground from the sleeve conductor S. Relays L and CO release. The line circuit is normal and ready for the next call.

If there is a permanent loop, as when a hand set is improperly returned to the hook-switch, the central office equipment seizes the line in a normal manner and then times out. Thereupon, the marker closes contacts M and applies battery through the resistor R2 to shunt the relay L winding III. Line relay L releases because it cannot hold over its winding II alone when it is energized via resistor R2. A holding circuit is now completed from ground through contacts L1, CO2, the permanent loop across conductors T and R, contacts CO3, L2 winding II of relay CO, and the winding of lockout relay LLO. Thereafter, the central office equipment releases, ground is removed from sleeve S and contacts M open. Contacts (not shown) on relay LLO give suitable alarm signals. Again, symbol 10 indicates that many line circuits share one lockout relay LLO.

When the permanent loop is broken, cutoff relay CO releases, and the circuit is returned to normal.

Briefly, in resume, the logic of the line circuit is:

Line normal:
  Relays L and CO released
Line requesting service:
  Relay L operated
  Relay CO released
Service being given to the line:
  Relay L operated
  Relay CO operated
Line in lockout:
  Relay L released
  Relay CO operated Moreover, since the marker positively drives the relays through the contacts M, there is no need for operating the relays under any marginal conditions which depend upon line loop characteristics, such as a slow release relay. Consequently, the relays may be less expensive and the line parameters may be wider than they were heretofore.

While the principles of the invention have been described above in connection with specific apparatus and application, it is to be understood that this description is made only by way of example and not as a limitation on the scope of the invention.

I claim:

1. A line circuit for an automatic telephone system comprising a pair of non-slow-release relays, said relays being released during normal conditions, means for operating one of said relays responsive to an off-hook condition on said line, means for operating both of said relays responsive to a completion of a circuit through said system, and means responsive to a lockout condition for positively driving said one relay to a released condition and the other of said relays to an operated condition.

2. The line circuit of claim 1 wherein said means for positively driving said relays comprises a separate circuit extending from said system to an individually associated line circuit.

3. The line circuit of claim 1 wherein said telephone system comprises a marker, said positive drive means including means in said marker for applying a potential to the relays in said line circuit responsive to said lockout condition, said potential shunting said one relay and holding the other of said relays.

4. The line circuit of claim 3 wherein said lockout condition comprises a permanent loop across a pair of wires associated with said line circuit, and means responsive to said release of said one relay for connecting said other relay across said pair of wires to be held over said permanent loop.

5. The line circuit of claim 4 and means for operating a lockout relay in series with said other relay and said pair of wires.

6. The line circuit of claim 4 and means responsive to the breaking of said loop across said pair of wires for releasing said other relay.

References Cited

UNITED STATES PATENTS 2,959,642 11/1960 Dubuar.
2,525,840 10/1950 Sterrett et al. -------- 179—19

KATHLEEN H. CLAFFY, Primary Examiner

T. W. BROWN, Assistant Examiner

U.S. Cl. X.R.

179—18